(12) United States Patent
Wang

(10) Patent No.: US 9,881,191 B2
(45) Date of Patent: Jan. 30, 2018

(54) METHOD OF CONTROLLING OPERATION OF CATALOGED SMART DEVICES

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 0 days.

(21) Appl. No.: 14/967,379

(22) Filed: Dec. 14, 2015

(65) Prior Publication Data

US 2017/0169266 A1 Jun. 15, 2017

(51) Int. Cl.
| | |
|---|---|
| G06F 17/00 | (2006.01) |
| G06K 7/10 | (2006.01) |
| G06F 17/30 | (2006.01) |
| G06K 19/06 | (2006.01) |
| H04W 4/00 | (2009.01) |
| H04W 76/02 | (2009.01) |
| H04L 12/28 | (2006.01) |

(52) U.S. Cl.
CPC ... *G06K 7/10881* (2013.01); *G06F 17/30879* (2013.01); *G06K 19/06028* (2013.01); *G06K 19/06037* (2013.01); *H04L 12/281* (2013.01); *H04L 12/282* (2013.01); *H04W 4/005* (2013.01); *H04W 76/02* (2013.01); *H04L 2012/285* (2013.01); *H04L 2012/2841* (2013.01)

(58) Field of Classification Search
USPC .......... 235/375, 383, 385, 462.01, 451, 492
See application file for complete search history.

(56) References Cited

U.S. PATENT DOCUMENTS

| | | | | |
|---|---|---|---|---|
| 5,263,098 | A * | 11/1993 | Horikami | G06K 9/4647 382/128 |
| 6,115,495 | A * | 9/2000 | Tachikawa | G06K 9/00463 382/165 |
| 6,759,946 | B2 * | 7/2004 | Sahinoglu | H04B 3/54 340/12.32 |
| 6,763,148 | B1 * | 7/2004 | Sternberg | G06F 17/30247 382/293 |
| 6,952,496 | B2 * | 10/2005 | Krumm | G06K 9/00228 382/165 |
| 8,897,816 | B2 * | 11/2014 | Makkonen | G06Q 30/02 382/165 |
| 9,225,519 | B1 * | 12/2015 | Fraccaroli | H04L 9/0838 |
| 9,485,384 | B2 * | 11/2016 | Lee | H04N 1/2129 |
| 2003/0190076 | A1 * | 10/2003 | DeLean | G06F 21/32 382/209 |

(Continued)

FOREIGN PATENT DOCUMENTS

| | | |
|---|---|---|
| JP | 2011146796 A | 7/2011 |
| JP | 2015515048 A | 5/2015 |

(Continued)

*Primary Examiner* — Tuyen K Vo
(74) *Attorney, Agent, or Firm* — Winston Hsu

(57) ABSTRACT

A method of controlling operation of cataloged smart devices includes generating an image of an item using a camera of a mobile computing device, the item corresponding to a smart device, identifying the item in the image, establishing a link to the smart device in response to identifying the item in the image, and controlling the smart device using the mobile computing device after establishing the link to the smart device.

3 Claims, 10 Drawing Sheets

(56) References Cited

U.S. PATENT DOCUMENTS

| | | |
|---|---|---|
| 2004/0208588 A1 | 10/2004 | Colmenarez |
| 2006/0152337 A1* | 7/2006 | Hsu .................... H04L 12/2809 340/5.5 |
| 2007/0279244 A1 | 12/2007 | Haughawout |
| 2010/0083338 A1* | 4/2010 | Chiang ................ H04N 5/4403 725/139 |
| 2012/0162515 A1* | 6/2012 | Lee ................. H04N 21/25816 348/563 |
| 2012/0182432 A1 | 7/2012 | Okamoto |
| 2012/0293551 A1 | 11/2012 | Momeyer |
| 2013/0314511 A1* | 11/2013 | Chen ................. H04N 5/23222 348/50 |
| 2014/0266639 A1* | 9/2014 | Zises ..................... G08C 17/02 340/12.28 |
| 2015/0161821 A1* | 6/2015 | Mazula ................ G06T 19/006 345/419 |
| 2016/0055391 A1* | 2/2016 | Kim .................. G06F 17/30256 382/203 |
| 2016/0080639 A1* | 3/2016 | Choi .................. H04N 5/23232 348/222.1 |
| 2016/0112630 A1* | 4/2016 | Kanumuri .......... H04N 5/23222 348/239 |
| 2016/0180441 A1* | 6/2016 | Hasan ................ G06Q 30/0631 705/26.7 |

FOREIGN PATENT DOCUMENTS

| | | |
|---|---|---|
| TW | M451380 U1 | 4/2013 |
| TW | 201408108 A | 2/2014 |
| TW | 201519105 A | 5/2015 |
| WO | 03001435 A1 | 1/2003 |
| WO | 2011145709 A1 | 11/2011 |

* cited by examiner

| Item type code | Brand code | Product code |
|---|---|---|
| A0001 | ABCDEFG | HIJKLMNO |

| Country code | User code | Room code | Container code | Item type code | Brand code | Product code | Item serial code | Check code |
|---|---|---|---|---|---|---|---|---|
| 886 | ABCDEFGHIJ | 001 | 00A | A0001 | ABCDEFG | HIJKLMNO | 0001 | 9 |

FIG. 7

METHOD OF CONTROLLING OPERATION OF CATALOGED SMART DEVICES

BACKGROUND OF THE INVENTION

1. Field of the Invention

The invention relates to a method of controlling smart devices, and more particularly, to a method of intuitively controlling smart devices by quickly identifying the smart devices that a user wishes to control.

2. Description of the Prior Art

Along with the prevalence of smart devices in the home or business, many ways of controlling the smart devices have been developed. One popular method of controlling smart devices relies on applications (apps) written for mobile phones or tablet computers. These apps may be limited to only being able to control smart devices manufactured by the same company that creates the corresponding apps. If a user has smart devices made by several different companies, the user may need to have several apps installed in order to be able to control all installed smart devices. Switching between apps adds extra steps to the control method, which can cause inconvenience to the user.

Also, within a given app, locating the smart device the user wishes to control can sometimes a long time since the user may need to navigate through many menus in the app or through lists of smart devices that the user has installed. Only once the correct smart device has been selected can the user begin to control the selected smart device. Consequently, the industry is in need of a more intuitive control method for allowing users to quickly and conveniently control smart devices.

SUMMARY OF THE INVENTION

It is therefore one of the primary objectives of the claimed invention to provide a method of controlling smart devices in an intuitive manner.

According to an exemplary embodiment of the claimed invention, a method of controlling operation of cataloged smart devices is disclosed. The method includes generating an image of an item using a camera of a mobile computing device, the item corresponding to a smart device, identifying the item in the image, establishing a link to the smart device in response to identifying the item in the image, and controlling the smart device using the mobile computing device after establishing the link to the smart device.

It is an advantage that the present invention provides a way for intuitively selecting and linking to a smart device that the user wishes to control. The user is able to point the mobile computing device right at the smart device the user wishes to control, thereby avoiding the need to go through extensive menus or lists in order to select the smart device that the user wishes to control.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 illustrates a table containing fields in the UID number.

DETAILED DESCRIPTION

Figure 1:
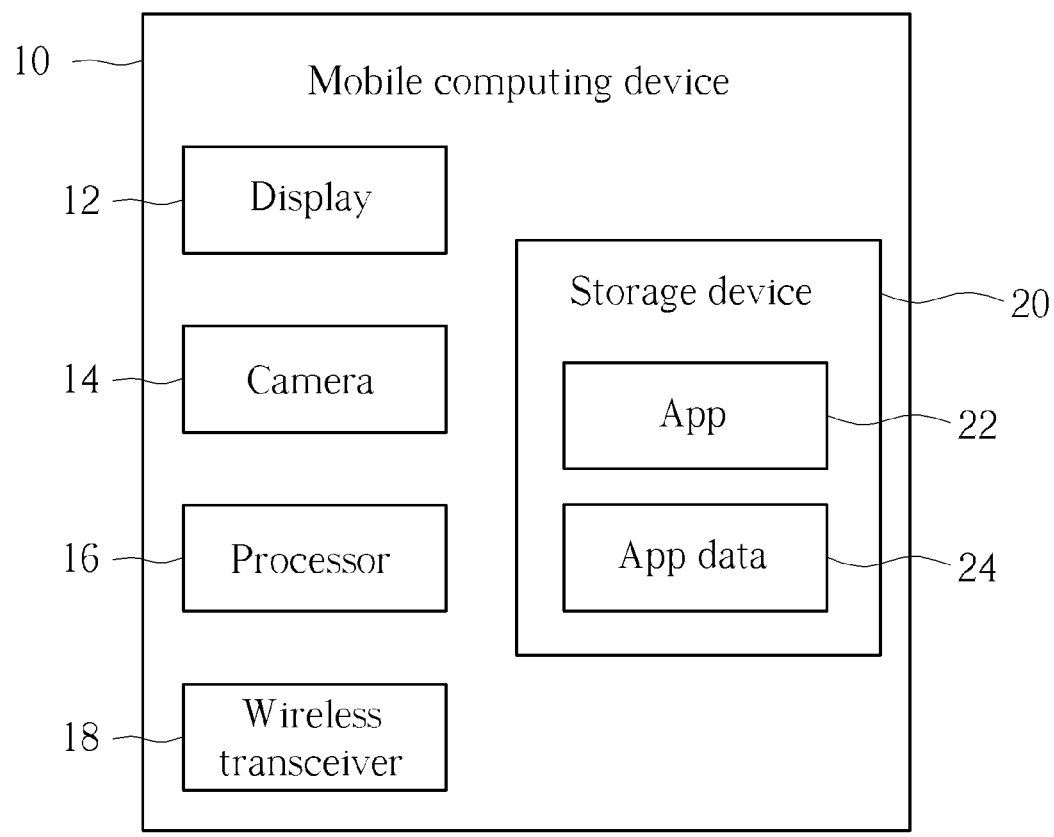
FIG. 1 is a functional block diagram of a mobile computing device that is used for executing an application for selecting and controlling smart devices.

Please refer to FIG. 1. FIG. 1 is a functional block diagram of a mobile computing device 10 that is used for executing an application (app) 22 for selecting and controlling smart devices. To provide a descriptive name for the app, the app will be referred to below as the Intuitive Control app.

The mobile computing device 10 comprises a display 12 that is preferably a touchscreen, a camera 14, a processor 16, a wireless transceiver 18 such as a Wireless Fidelity (Wi-Fi) transceiver, and a storage device 20. The storage device 20 stores the Intuitive Control app 22 as well as app data 24 that is used in conjunction with the Intuitive Control app 22. The storage device 20 is preferably a non-volatile memory such as flash memory. The mobile computing device 10 may be any mobile device having both a display and a camera, such as a tablet computer or a smartphone, but other devices such as a notebook computer can be used as well.

Figure 2:
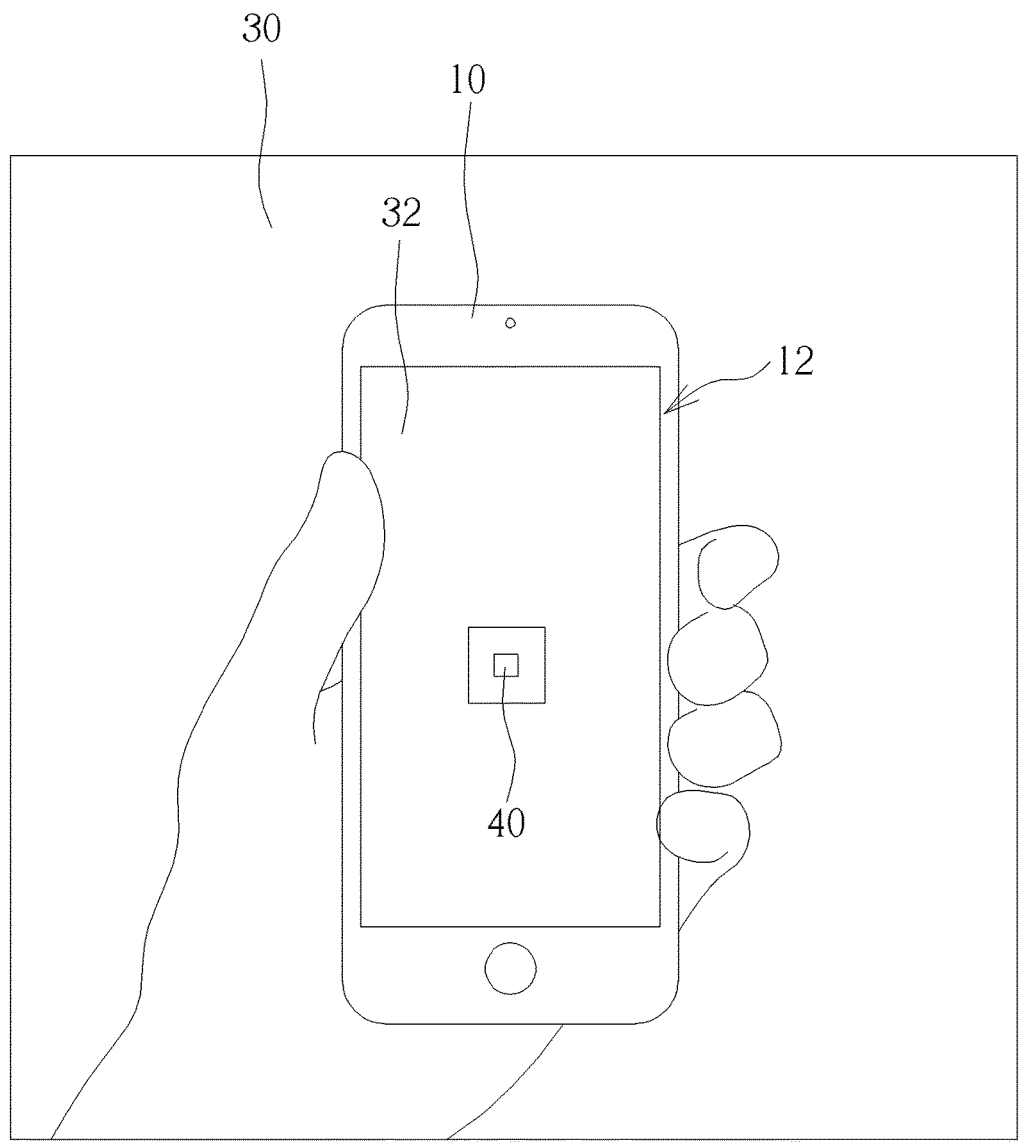
FIG. 2 illustrates using the camera of the mobile computing device to create an image corresponding to a room.

A description of using the Intuitive Control app 22 will be given below. Please refer to FIG. 2. FIG. 2 illustrates using the camera 14 of the mobile computing device 10 to create an image 32 corresponding to a room 30. The image 32 can be created in one of several different ways. First, the image 32 can be created when a user of the mobile computing device 10 takes a picture with the camera 14. The resulting picture file can be used as the image 32. Second, the image 32 can be created when the user of the mobile computing device 10 captures a video with the camera 14 to create a video file. A screenshot from the video file can be used as the image 32. Third, the image 32 can be created when a user generates a preview image with the camera 14. The preview image is created for allowing the user to view a picture in a virtual "view finder" before the user takes a picture or captures a video with the camera 14.

The image 32 is shown on the display 12 of the mobile computing device 10, and the image shows a switch 40 that corresponds to a smart device. In this example, the smart device could be a light in the room 30, and the switch 40 is used for controlling the light. When the switch 40 appears in the image 32, the Intuitive Control app 22 identifies the switch 40, and a link between the Intuitive Control app 22 and the smart device corresponding to the switch 40 is established. Once the link between the Intuitive Control app 22 and the smart device corresponding to the switch 40 has been established, the Intuitive Control app 22 is then able to control the smart device.

Figure 3:
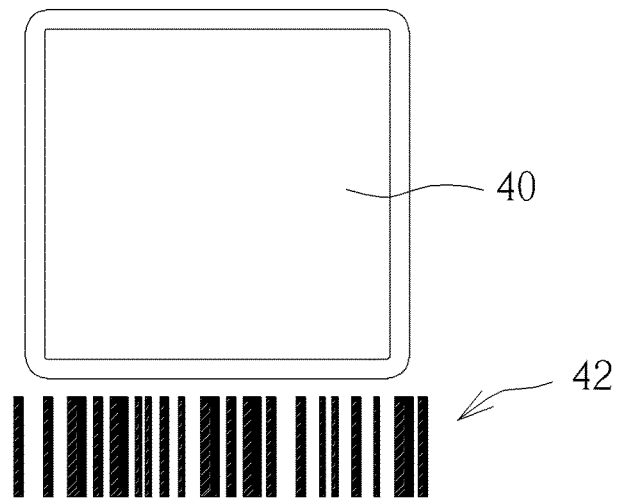
FIG. 3 illustrates a one-dimensional bar code associated with the switch.
Figure 4:
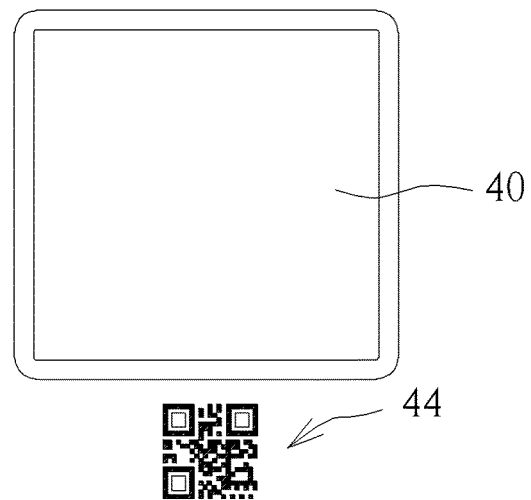
FIG. 4 illustrates a two-dimensional bar code associated with the switch.

The Intuitive Control app 22 is not limited to only identifying the switch 40 or other switches for smart devices. Instead, other ways of identifying a smart device can be used. Please refer to FIGS. 3 and 4. FIG. 3 illustrates a one-dimensional bar code 42 associated with and located near the switch 40. FIG. 4 illustrates a two-dimensional bar code 44 associated with and located near the switch 40. Both the one-dimensional bar code 42 and the two-dimensional bar code 44 work in the same way. When the camera 14 of the mobile computing device 10 creates an image containing the one-dimensional bar code 42 or the two-dimensional bar code 44, the Intuitive Control app 22 scans the bar code, identifies the corresponding smart device, and establishes the link between the Intuitive Control app 22 and the corresponding smart device. The Intuitive Control app 22 is then able to control the smart device corresponding to the one-dimensional bar code 42 or the two-dimensional bar code 44.

Besides using the one-dimensional bar code 42 or the two-dimensional bar code 44, other methods could be used to identify a smart device and to establish a link between the Intuitive Control app 22 and the corresponding smart device. For example, near field communication (NFC) technology could be used. A smart device could have an NFC tag or an NFC device that, when scanned by the mobile computing device 10, allows the Intuitive Control app 22 to identify the smart device and then to establish a link to the smart device. Radio frequency identification (RFID) technology could be used in the same way, as well as any other technology that provides a link or allows the user to key in a link to thereby connect to a smart device.

Figures 5, 6:
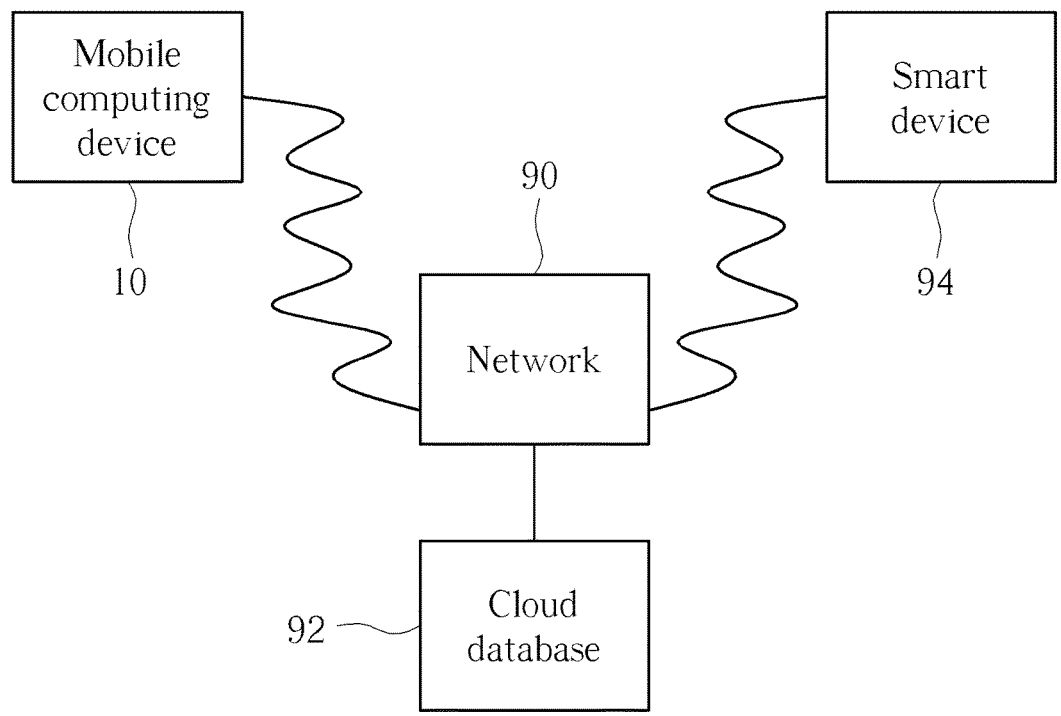
FIG. 5 is a functional block diagram illustrating interaction between the mobile computing device and a smart device via a network.
FIG. 6 illustrates a table containing fields in the ID code.

Please refer to FIG. 5. FIG. 5 is a functional block diagram illustrating interaction between the mobile computing device 10 and a smart device 94 via a network 90. The mobile computing device 10 is preferably connected to the network 90 wirelessly, and may use the wireless transceiver 18 to establish this wireless connection. The network 90 can be connected to the smart device 94 either wirelessly or through a wired connection. A cloud database 92 is used to store information used to help identify the items corresponding to the smart device 94. For instance, in FIGS. 3 and 4 above, the cloud database 92 would store data corresponding to the one-dimensional bar code 42 and the two-dimensional bar code 44, and would also store linking information for the smart device 94 corresponding to the one-dimensional bar code 42 or the two-dimensional bar code 44. That is, the cloud database 92 reads data when scanning either the one-dimensional bar code 42 or the two-dimensional bar code 44, compares this read data with a plurality of predefined data entries stored in the cloud database 92, and identifies the corresponding one-dimensional bar code 42 or two-dimensional bar code 44 when the read data matches one of the plurality of predefined data entries stored in the cloud database 92.

When the one-dimensional bar code 42 or the two-dimensional bar code 44 are not used, such as the example shown in FIG. 2 in which the switch 40 is identified, environmental features surrounding the switch 40 are used for identifying the switch 40. In this case, the environmental features surrounding the switch 40 in the image 32 are analyzed to generate an environmental code. The generated environmental code is then compared with a plurality of predetermined environmental codes stored in the cloud database 92, and the switch 40 is identified when the generated environmental code matches one of the plurality of predetermined environmental codes stored in the cloud database 92.

Besides storing information about how to identify the switch 40, the one-dimensional bar code 42, or the two-dimensional bar code 44, the cloud database 92 also stores descriptive information about each smart device to be controlled. In the cloud database 92, the descriptive information may include an identification (ID) code assigned to each type of smart device. Each of the fields in the ID code can be independently searchable in the event the user wishes to search for the smart device in the future. Please refer to FIG. 6. FIG. 6 illustrates a table containing fields in the ID code. The table contains an "item type code" identifying the category type of the smart device as "A0001", a "brand code" corresponding to the brand of the smart device is "ABCDEFG", and a "product ID code" corresponding to the product ID indicating the model of the smart device "HIJKLMNO". The ID code is the same for any given model smart device. For example, if a user has matching smart devices on either side of a bed, both of these smart devices would have the same ID code.

In addition to being assigned an ID code, each smart device in the Intuitive Control app 22 will be assigned its own unique identification (UID) number that is also stored in the cloud database 92. Please refer to FIG. 7. FIG. 7 illustrates a table containing fields in the UID number. Each UID number will contain series of codes according to the location and the type of the smart device. For example, the smart device having the ID code shown in FIG. 6 can be assigned the following codes. The UID number contains the following information: a "country code" corresponding to the country where the smart device is located is "886", a "user code" corresponding to the user cataloging the smart device is "ABCDEFGHIJ", a "room code" corresponding to the room where the smart device is located is "001", a "container code" corresponding to the storage unit where the smart device is located is "00A", the "item type code" identifying the category type of the smart device is "A0001", the "brand code" corresponding to the brand of the smart device is "ABCDEFG", the "product ID code" corresponding to the product ID indicating the model of the smart device is "HIJKLMNO", an "item serial number" identifying the smart device using a unique serial number is "0001", and a "check code" used as a checksum for the rest of the codes in the UID is "9". In the Intuitive Control app 22, each unique smart device will be given a UID number. Even two identical smart devices in the same room would have different UID numbers since the smart device serial numbers would be different for each smart device.

Figure 8:
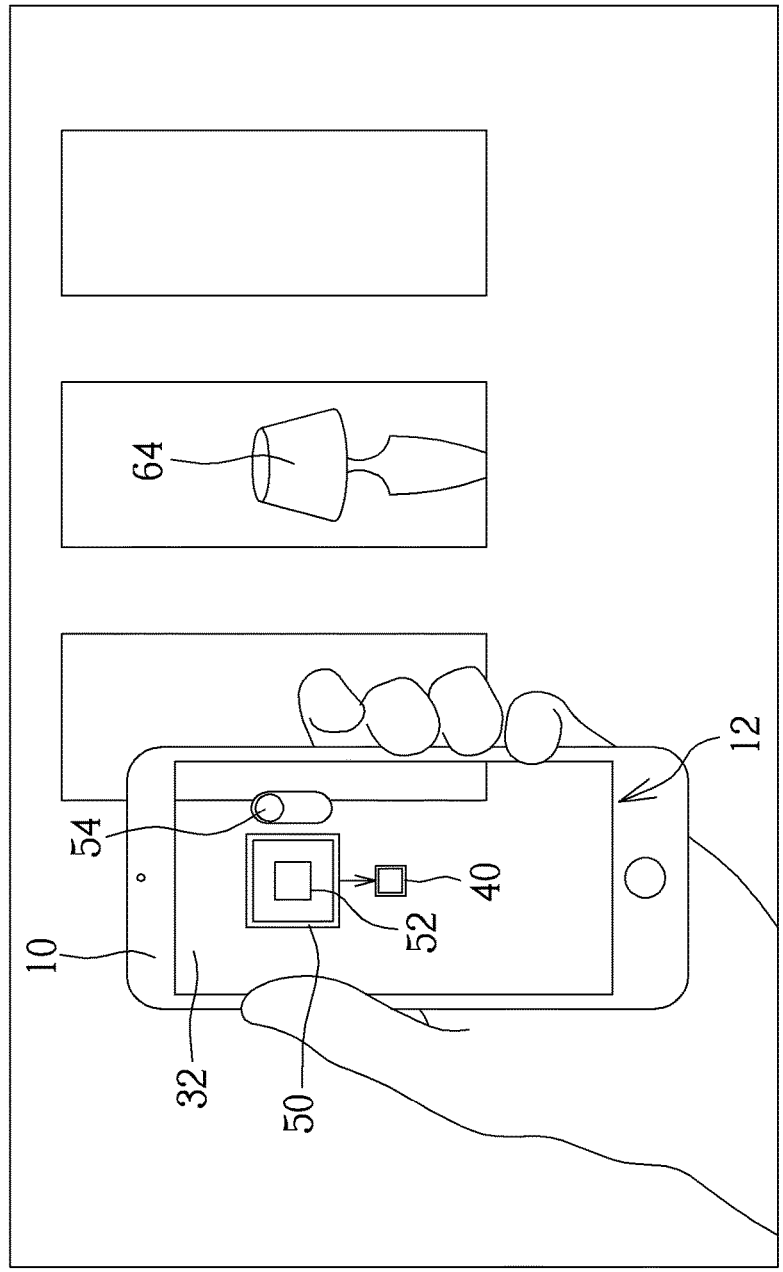
FIG. 8 and FIG. 9 are diagrams illustrating control buttons corresponding to a smart device corresponding to the identified switch.
Figure 9:
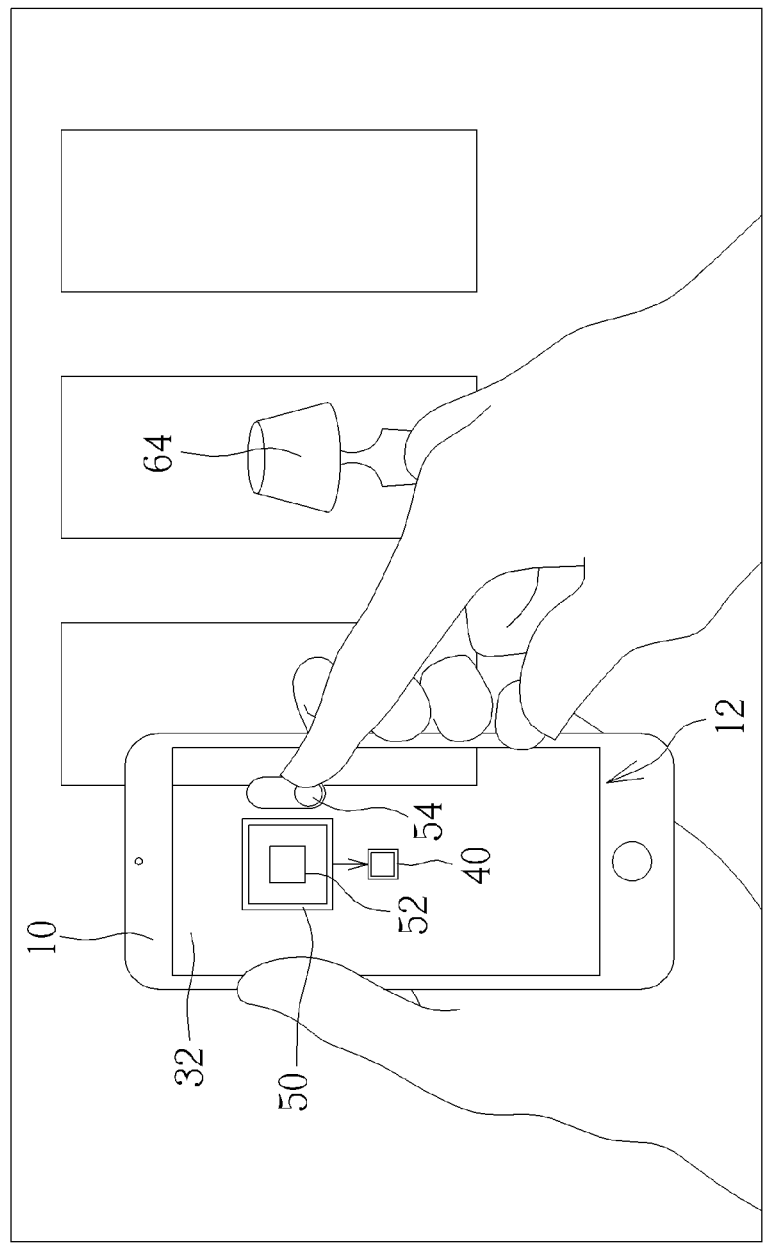

Once the smart device 94 is identified, control information for the smart device 94 is obtained in the Intuitive Control app 22. This control information can be downloaded from the cloud database 92 via the network 90 or the control information can be stored in advance in the app data 24 within the storage device 20 of the mobile computing device 10. The control information may be used to show control buttons in the Intuitive Control app 22. Please refer to FIGS. 8 and 9. FIG. 8 and FIG. 9 are diagrams illustrating control buttons corresponding to a smart device corresponding to the identified switch 40. After the switch 40 is identified using the Intuitive Control app 22, the user may be given the opportunity to confirm that the switch 40 is the correct item that the user wishes to select. On the image 32 shown on the display 12 of the mobile computing device 10, the switch 40 is shown within the image 32. Once the switch 40 is identified, a control menu pops up on the image 32 containing a reproduced image 52 of the switch 40 having an outline 50. If other identified items are also shown in the image 32, outlines corresponding to the other identified items can be shown as well. When a user wishes to select one of the identified items, the user simply needs to tap on the reproduced image 52 shown within the outline 50. The outline 50 can then change appearance to give the user visual feedback that this item has been selected. Once the reproduced image 52 and outline 50 have been selected, the Intuitive Control app 22 establishes a link to the smart device that corresponds to the switch 40 and a corresponding control button 54 appears. The user of the Intuitive Control app 22 can then control the smart device corresponding to the switch 40 by moving the control button 54 up or down. Moving the control button 54 up, as shown in FIG. 8, will turn on the smart device. Moving the control button 54 down, as shown in FIG. 9, will turn off the smart device. If the smart device is a light, this simple kind of control button 54 may be sufficient for controlling all functions of the light. If the smart device has more complicated control functions, such as that of a smart television or a smart thermostat, then other control buttons or control menus will appear for allowing the user to fully control the smart device. Please note that instead of using the Intuitive Control app 22 for controlling all smart devices, the Intuitive Control app 22 can also provide links for opening other dedicated apps that are used for controlling certain smart devices.

Instead of the user selecting an identified item before establishing a link to the smart device corresponding to the item, a link to the smart device can be directly established once the item has been identified if there is only one item that was identified. When two or more items were identified, the user should select an item before a link is established. On the other hand, when only one item is identified, the link can be made directly without any prior selection being needed.

Figure 10:
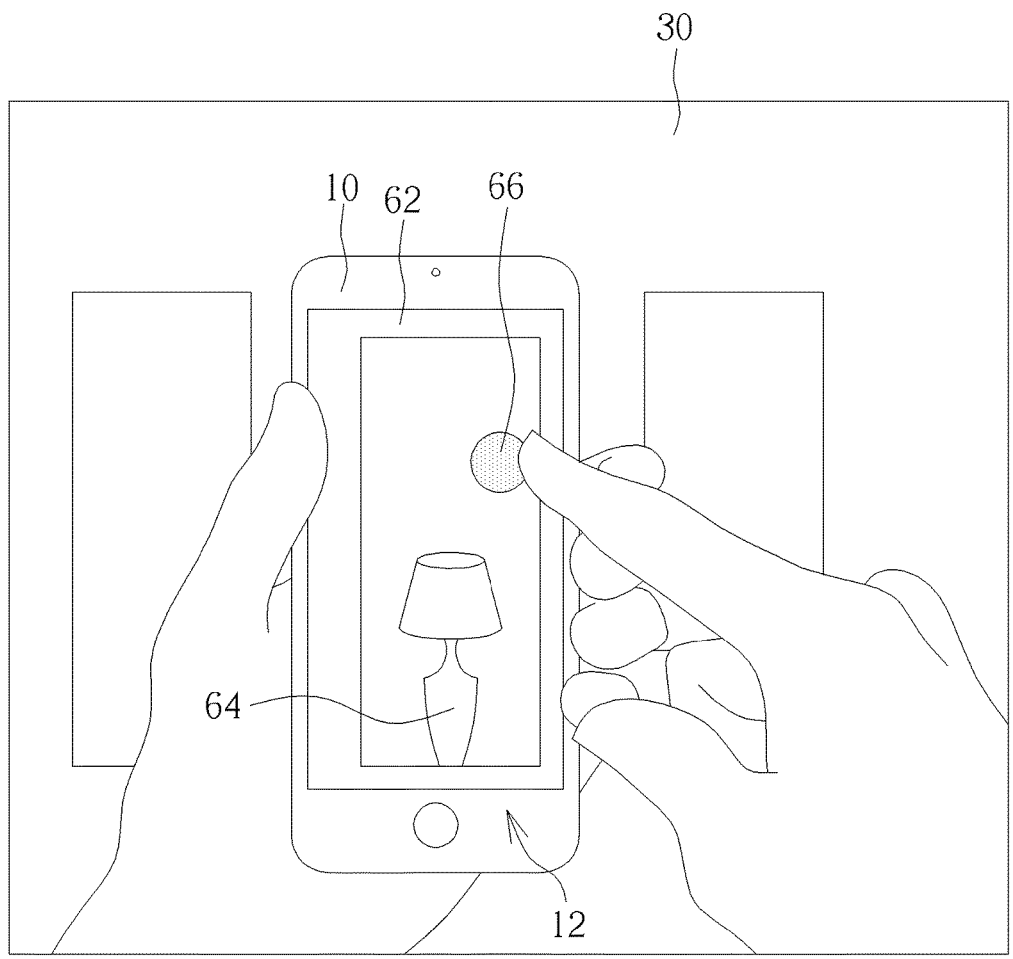
FIG. 10 shows a user controlling a smart lamp in another embodiment of the present invention.

In FIGS. 8 and 9, another smart device is also present in the room 30, namely a smart lamp 64. However, the smart lamp was not shown in the image 32, and was therefore not available for the user to select. Please refer to FIG. 10. FIG. 10 shows a user controlling the smart lamp 64 in another embodiment of the present invention. Camera 14 of the mobile computing device 10 creates an image 62 corresponding to the room 30. The smart lamp 64 is shown in the image 62, and once the smart lamp 64 is identified based on its appearance, the Intuitive Control app 22 links to the smart lamp 64 and a control button 66 appears next to the smart lamp 64 in the image 62. The user is then given the opportunity to control the smart lamp 64 using the control button 66. Differing from the previous embodiment, the smart lamp 64 itself appears in the image 62 shown on the display 12 of the mobile computing device 10. The image 62 does not identify a switch corresponding to the smart lamp 64, and instead identifies the smart lamp 64 directly.

Figure 11:
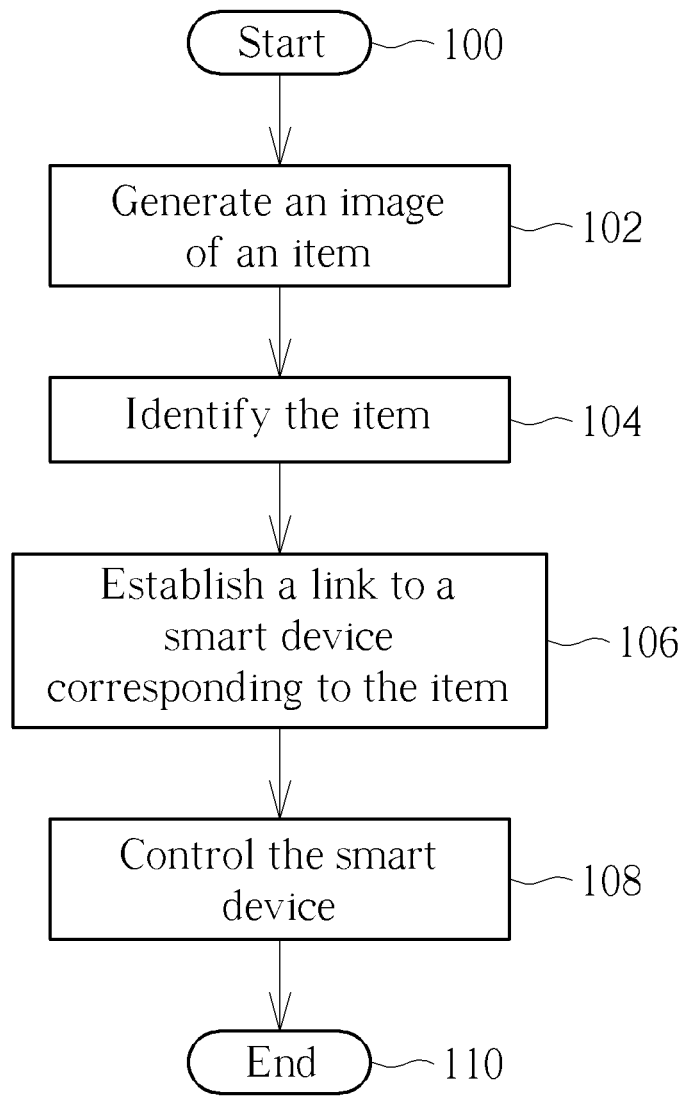
FIG. 11 is a flowchart describing a method of controlling smart devices according to the present invention.

Please refer to FIG. 11. FIG. 11 is a flowchart describing a method of controlling smart devices using the Intuitive Control app 22 according to the present invention. Steps in the flowchart will be explained as follows.

Step 100: Start.

Step 102: Generate an image of an item. For example, generate the image 32 containing the switch 40, as shown in FIG. 2.

Step 104: Identify the item. For example, the switch 40 is identified.

Step 106: Establish a link to a smart device corresponding to the item. For example, a link is established to a smart device corresponding to the switch 40.

Step 108: Control the smart device using the mobile computing device.

Step 110: End.

Figure 12:
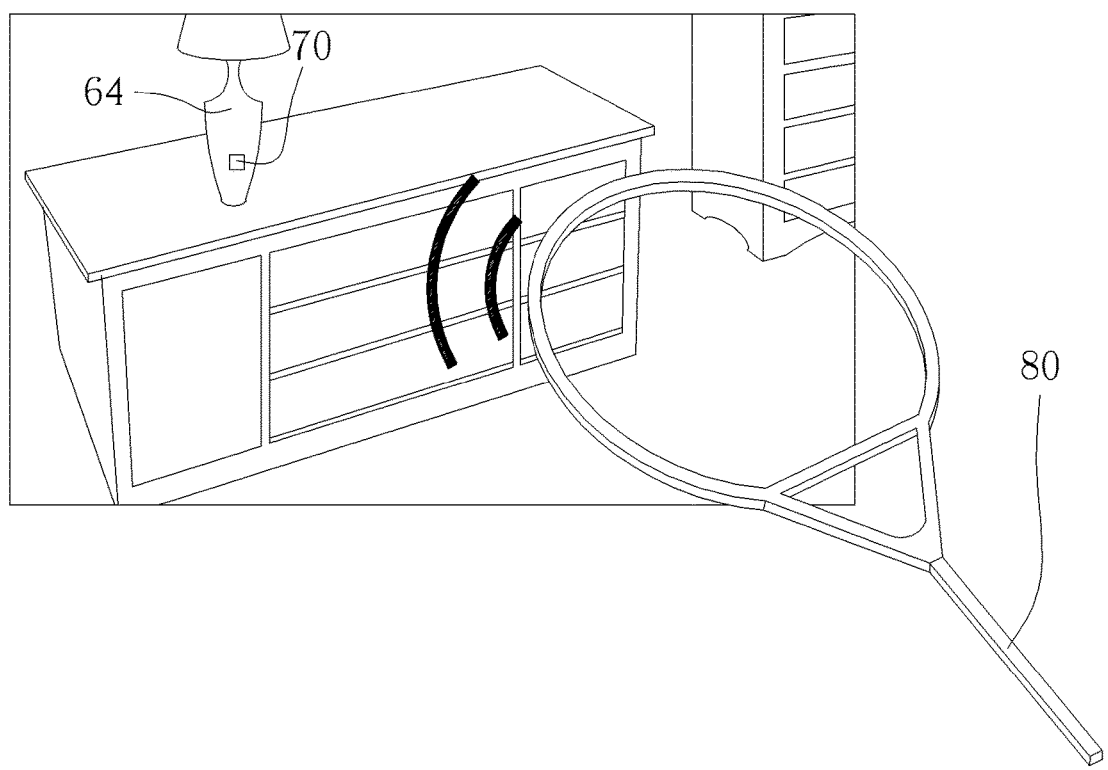
FIG. 12 illustrates identifying a smart device using a radio frequency identification (RFID) tag according to another embodiment of the present invention.

Please refer to FIG. 12. FIG. 12 illustrates identifying a smart device using an RFID tag according to another embodiment of the present invention. FIG. 12 shows the smart lamp 64 now having an RFID tag 70 affixed to it for uniquely identifying the smart lamp 64. An RFID scanner 80 can then be used to scan the RFID tag 70 for identifying the smart lamp 64 and allowing the user to quickly control the smart lamp 64 using the Intuitive Control app 22. Preferably the RFID scanner 80 is a handheld RFID scanner. As a non-limiting example, the RFID scanner 80 illustrated in FIG. 12 is a shown as being a racquet-shaped RFID scanner.

In summary, the present invention provides a way for intuitively selecting and linking to a smart device that the user wishes to control. The user is able to point the mobile computing device 10 right at the smart device or an item corresponding to the smart device that the user wishes to control, thereby avoiding the need to go through extensive menus or lists in order to select the smart device that the user wishes to control.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling operation of cataloged smart devices, the method comprising:
   generating an image of an item using a camera of a mobile computing device, the item corresponding to a smart device;
   identifying the item in the image, comprising:
      analyzing environmental features present in the image that surround the item in the image to generate an environmental code;
      comparing the generated environmental code with a plurality of predetermined environmental codes stored in a database; and
      identifying the item when the generated environmental code matches one of the plurality of predetermined environmental codes stored in the database;
   establishing a link to the smart device in response to identifying the item in the image; and
   controlling the smart device using the mobile computing device after establishing the link to the smart device.

2. A method of controlling operation of cataloged smart devices, the method comprising:
   searching a cloud database to find at least one entry corresponding to the cataloged smart device, each entry in the cloud database comprising:
      information about how to identify the cataloged smart device;
      linking information for the cataloged smart device;
      an identification code assigned to each type of cataloged smart device; and
      a unique identification number associated with the cataloged smart device; selecting one of the entries to generate a selected entry;
   receiving the linking information comprised in the selected entry;
   establishing a link to the cataloged smart device in response to the linking information; and controlling the cataloged smart device using a mobile computing device after establishing the link to the cataloged smart device;

wherein the unique identification number comprises the following information;

a country code corresponding to a country where the cataloged smart device is located;

a user code corresponding to a user cataloging the cataloged smart device;

a room code corresponding to a room where the cataloged smart device is located;

an item type code identifying a category type of the cataloged smart device;

a product ID code corresponding to a product ID indicating a model of the cataloged smart device;

an item serial number identifying the cataloged smart device using a unique serial number; and a check code used as a checksum for the rest of the codes in the unique identification number; and the method further comprising selecting one of the entries according to the unique identification number to generate the selected entry.

3. The method of claim 2 wherein the identification code comprises the following independently searchable fields:

an item type code identifying the category type of the cataloged smart device;

a brand code corresponding to the brand of the cataloged smart device; and a product ID code corresponding to a product ID indicating the model of the cataloged smart device; and the method further comprising searching at least one of the independently searchable fields before selecting one of the entries to generate the selected entry.

\* \* \* \* \*